S. SOULES.
Potato Digger.
No. 55,384.
Patented June 5, 1866.
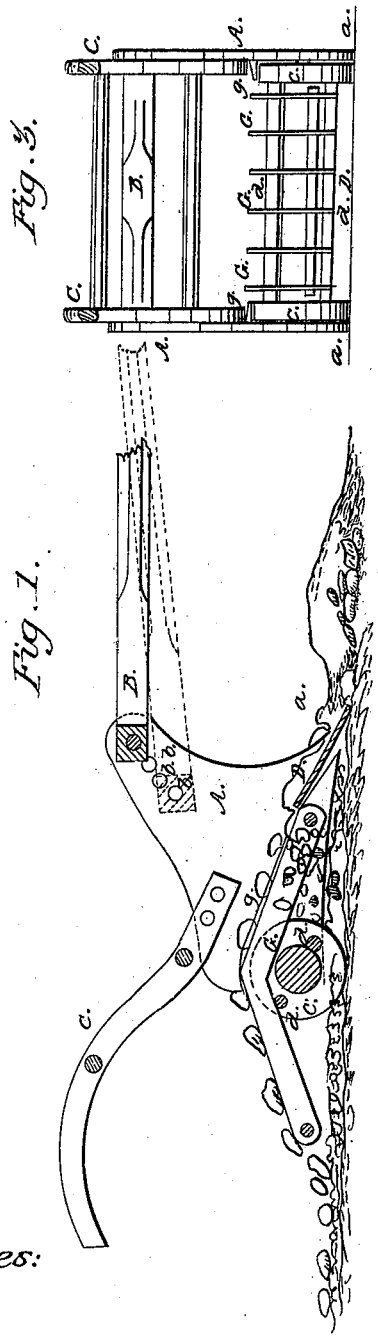
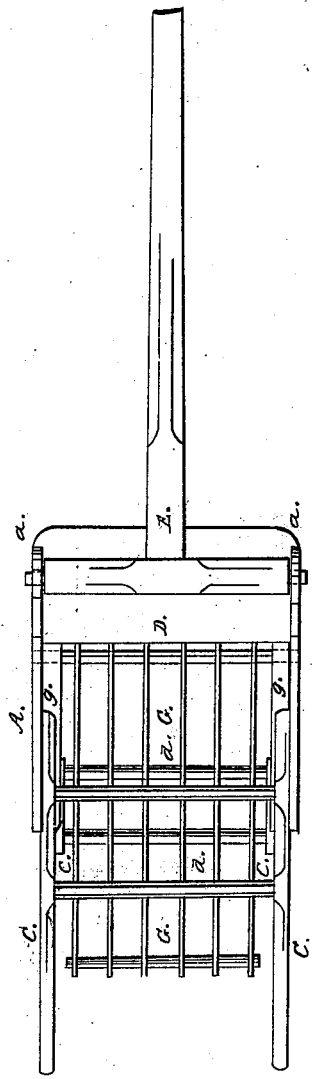
Witnesses:
Inventor:
Simon Soules
by his Attys

UNITED STATES PATENT OFFICE.

SIMON SOULES, OF DOWAGIAC, MICHIGAN.

IMPROVEMENT IN POTATO-DIGGERS.

Specification forming part of Letters Patent No. 55,384, dated June 5, 1866.

*To all whom it may concern:*

Be it known that I, SIMON SOULES, of Dowagiac, Cass county, State of Michigan, have invented a new and Improved Implement for Digging Potatoes; and I do hereby declare that the following is a full, clear, and exact description thereof, reference being had to the accompanying drawings, making a part of this specification, in which—

Figure 1 is a longitudinal section through the improved implement, showing the operation of digging potatoes. Fig. 2 is a top view. Fig. 3 is an elevation of the rear end of the machine.

Similar letters of reference indicate corresponding parts in the several figures.

The nature of my invention consists in combining with a shovel or scoop having vertical sides and an inclined shovel-blade a double inclined grating, which is pivoted to the scoop and vibrated by wipers or tappets which are applied to supporting-wheels, so that the earth will be separated from the potatoes during their passage over the grate, as will be hereinafter described.

To enable others skilled in the art to understand my invention, I will describe its construction.

In the accompanying drawings, A A represent the two parallel sides of the machine, which are curved about as represented in Fig. 1, so as to afford an elevated support in front for the draft-pole B, a curved bottom, and a tapering point, *a*. The draft-pole B is pivoted to the forward overhanging portions of the side plates, A A, and a number of holes, *b*, are made through said portions for admitting of the adjustment of the rear end of the draft-pole, so that the machine can be made to dig deeper or shallower, as may be desired. The stilts or handles C C are secured to the rear ends of the plates A A, so that the attendant can control the movements of the machine from behind the same.

D represents a shovel-blade, which is suitably secured to the front parts of the plates A A in a position transversely across the same, and inclining forward so as to readily enter the soil and elevate the same as the machine is drawn forward.

The rear part of the machine is supported upon wheels or rollers *c c*, which are connected together by an axle extending transversely across the machine between the two plates, A A, and having its bearing in these plates. There are two or more rods, *d d*, extending across from one wheel or roller, *c*, to the other, *c*, for the purpose of giving a shaking motion to a grating, G, as the machine is moved forward. This grating G is pivoted at its front end beneath the rear upper edge of the shovel or scoop D, and extends from this point backward and upward over the bars *d d* and then inclines downward, as shown in Fig. 1.

By thus forming the grating so as to incline in two directions from a point which is over the striking-bars the earth and potatoes will be carried over these bars and the potatoes will be delivered upon the ground in rear of the machine. As the potatoes are elevated toward the ridge of the grating the earth which was scooped up with them will be allowed to fall through the spaces between the grate-bars, leaving the potatoes to roll down the rear inclined portion of the grating free from earth. The bars *a a* serve as tappets for giving a vibrating movement to the grating and thus facilitating the separation of the earth from the potatoes.

On each side plate, A, inside, is a guard or fender, *g*, which extends from the rear termination of the shovel backward and upward and over the wheel *c*, as shown in Figs. 1 and 2. This fender *g* is intended to prevent the grating from clogging by earth banking up at its sides. It also prevents earth or small potatoes from escaping at the sides of the fender.

Having thus described my invention, what I claim as new, and desire to secure by Letters Patent, is—

1. The construction of the sides A A, of the form substantially as shown, with fenders *g g*, in combination with the forward-inclined shovel D and the inclined grating G, substantially as described.

2. In combination with the upright sides A and inclined shovel D and the inclined grating G, the rollers *c c* and their tappets *d*, substantially as described.

3. The double-inclined grating G, hinged and operated substantially as described.

SIMON SOULES.

Witnesses:
A. W. BRUCE,
I. F. WARES.